(12) United States Patent
Andersen

(10) Patent No.: US 6,434,715 B1
(45) Date of Patent: Aug. 13, 2002

(54) METHOD OF DETECTING SYSTEMIC FAULT CONDITIONS IN AN INTELLIGENT ELECTRONIC DEVICE

(75) Inventor: Bo L. Andersen, Burlington, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/332,962

(22) Filed: Jun. 14, 1999

(51) Int. Cl.[7] .................................................. H02H 3/05
(52) U.S. Cl. ........................ 714/39; 361/93.1; 361/79; 340/638; 714/48
(58) Field of Search ............................... 714/39, 47, 57, 714/48, 822, 26; 361/93.2, 65, 63, 62, 93.1, 78, 79; 702/57, 58; 340/638, 639; 700/292, 293

(56) References Cited

U.S. PATENT DOCUMENTS

| | | | | |
|---|---|---|---|---|
| 4,377,836 A | * | 3/1983 | Elms et al. ................. 361/96 |
| 4,400,783 A | * | 8/1983 | Locke et al. ............... 324/113 |
| 4,589,052 A | | 5/1986 | Dougherty | |
| 4,589,074 A | | 5/1986 | Thomas et al. | |
| 5,335,135 A | * | 8/1994 | Kinney ........................ 361/65 |
| 5,343,155 A | * | 8/1994 | Kejariwal et al. .......... 324/509 |
| 5,565,783 A | * | 10/1996 | Lau et al. ................... 324/127 |
| 5,734,576 A | * | 3/1998 | Klancher .................... 324/424 |
| 5,905,615 A | * | 5/1999 | Rivetti et al. ................. 361/63 |
| 6,002,260 A | * | 12/1999 | Lau et al. ................... 324/509 |
| 6,105,087 A | * | 8/2000 | Rivoir ........................ 710/100 |
| 6,112,136 A | * | 8/2000 | Paul et al. .................. 700/293 |

FOREIGN PATENT DOCUMENTS

| | | |
|---|---|---|
| JP | 0 483 744 A | 5/1992 |
| JP | 05 137279 A | 6/1993 |

* cited by examiner

Primary Examiner—Robert Beausoleil
Assistant Examiner—Yolanda L. Wilson
(74) Attorney, Agent, or Firm—Cantor Colburn LLP

(57) ABSTRACT

A method of detecting systemic fault conditions in an intelligent electronic device is presented. The intelligent electronic device includes a microcontroller and associated memories. An algorithm (program) stored in a memory of the intelligent electronic device detects systemic fault conditions, i.e., root causes, as indicated by repeated, similar fault events.

20 Claims, 5 Drawing Sheets

FIG. 2A

| FAULT EVENT (DEVICE DEPENDENT) | # of occurrence since last reset (Repeat event algorithm software tracks and stores in non-volatile memory) | Time date stamp of events (optional: Repeat event algorithm software tracks and stores in non-volatile memory) | Mean time between events (Repeat event algorithm software tracks and stores in non-volatile memory) | Generate repeat event if this number of events have been accumulated in event storage (user selected) | Generate repeat event if average interval between the last X events is less than Y hours, Z minutes (user selected) | Generate repeat event if average interval between the last X events (user input minimum value 3) is decreasing over time by Y% relative to interval between the first two events Example: 3 events, event if 30% decrease: #1 day 0 at 1200 hours: #2 day 1 at 2400 hours: interval = 36 hours # 3 day 2 at 1200 hours: interval = 12 hours average decrease % = (36 + 12) 2/12 = 200% |
|---|---|---|---|---|---|---|
| GROUND FAULT PHASE A | 1 | 010599 23:45:23:22 | - | 2 | 4,5,0 | 3,30% |
| GROUND FAULT PHASE B | 0 | - | - | 2 | 4,5,0 | 3,30% |
| GROUND FAULT PHASE C | 0 | - | - | 2 | 4,5,0 | 3,30% |
| INSTANTANEOUS PHASE A | 0 | - | - | 3 | 4,5,0 | 3,20% |
| INSTANTANEOUS PHASE B | 0 | - | - | 3 | 4,5,0 | 3,20% |
| INSTANTANEOUS PHASE C | 0 | - | - | 3 | 4,5,0 | 3,20% |

FIG. 2B

| FAULT EVENT (DEVICE DEPENDENT) | # of occurrence since last reset (Repeat event algorithm software tracks and stores in non-volatile memory) | Time date stamp of events (optional: Repeat event algorithm software tracks and stores in non-volatile memory) | Mean time between events (Repeat event algorithm software tracks and stores in non-volatile memory) | Generate repeat event if this number of events have been accumulated in event storage (user selected) | Generate repeat event if average interval between the last X events is less than Y hours, Z minutes (user selected) | Generate repeat event if average interval between the last X events (user input minimum value 3) is decreasing over time by Y% relative to interval between the first two events Example: 3 events, event if 30% decrease: #1 day 0 at 1200 hours: #2 day 1 at 2400 hours: interval = 36 hours #3 day 2 at 1200 hours: interval = 12 hours average decrease % = (36 + 12) 2/12 = 200% |
|---|---|---|---|---|---|---|
| UNDERFREQUENCY -PHASE A | 5 | 010599 23:45:23:22<br>010899 21:44:11:45<br>021999 13:12:55:55<br>022299 04:02:44:33<br>022299 04:23 32:05 | Total X days Y hours Z minutes<br>Interval X1 days Y1 hours Z1 minutes<br>Interval X2 days Y2 hours Z2 minutes<br>Interval X3 days Y3 hours Z3 minutes<br>Interval X4 days Y4 hours Z4 minutes | 2 | 2,0,12 | 3,20% |
| UNDERFREQUENCY PHASE B | 0 | - | - | 2 | 2,0,12 | 3,20% |
| UNDERFREQUENCY PHASE C | 0 | - | - | 2 | 2,0,12 | 3,20% |
| OVERFREQUENCY PHASE A | 1 | 011999 13:12:55:56 | - | 22 | 2,0,12 | 3,20% |

FIG. 2C

| FAULT EVENT (DEVICE DEPENDENT) | # of occurrence since last reset (Repeat event algorithm software tracks and stores in non-volatile memory) | Time date stamp of events (optional: Repeat event algorithm software tracks and stores in non-volatile memory) | Mean time between events (Repeat event algorithm software tracks and stores in non-volatile memory) | Generate repeat event if this number of events have been accumulated in event storage (user selected) | Generate repeat event if average interval between the last X events is less than Y hours, Z minutes (user selected) | Generate repeat event if average interval between the last X events is decreasing over time by Y% relative to interval between the first two events Example: 3 events, event if 30% decrease: #1 day 0 at 1200 hours: #2 day 1 at 2400 hours: interval = 36 hours #3 day 2 at 1200 hours: interval = 12 hours average decrease % = (36 + 12) 2/12 = 200% |
|---|---|---|---|---|---|---|
| OVERFREQUENCY PHASE B | 1 | 021999 13:12:55:55 | - | 22 | 2,0,12 | 3,20% |
| OVERFREQUENCY PHASE C | 0 | - | - | 22 | 2,0,12 | 3,20% |
| OVERCURRENT (USER DEFINED) PHASE A | 1 | 021999 13:12:55:55 | - | 4 | 3,0,1 | 3,20% |
| OVERCURRENT (USER DEFINED) PHASE B | 3 | 021999 13:12:55:55 022299 04:02:44:33 022299 04:23:32:05 | Total X days Y hours Z minutes Interval X1 days Y1 hours Z1 minutes Interval X2 days Y2 hours Z2 minutes | 4 | 3,0,1 | 3,20% |
| OVERCURRENT (USER DEFINED) PHASE C | 2 | 022299 13:12:55:22 022399 23:44:11:59 | Total X days Y hours Z minutes Interval X1 days Y1 hours Z1 minutes | 4 | 3,0,1 | 3,20% |
| DOWNED CONDUCTOR | 1 | 081999 17:38:55:89 | - | 4 | 3,0,1 | 3,20% |

FIG. 2D

| FAULT EVENT (DEVICE DEPENDENT) | # of occurrence since last reset (Repeat event algorithm software tracks and stores in non-volatile memory) | Time date stamp of events (optional: Repeat event algorithm software tracks and stores in non-volatile memory) | Mean time between events (Repeat event algorithm software tracks and stores in non-volatile memory) | Generate repeat event if this number of events have been accumulated in event storage (user selected) | Generate repeat event if average interval between the last X events is less than Y hours, Z minutes (user selected) | Generate repeat event if average interval between the last X events (user input minimum value 3) is decreasing over time by Y% relative to interval between the first two events Example: 3 events, event if 30% decrease: #1 day 0 at 1200 hours: #2 day 1 at 2400 hours: interval = 36 hours #3 day 2 at 1200 hours: interval = 12 hours average decrease % = (36 ÷ 12) 2/12 = 200% |
|---|---|---|---|---|---|---|
| USER DEFINED FAULT 1 | 0 | - | - | 6 | 3,0,1 | 3,20% |
| USER DEFINED FAULT 2 | 0 | - | - | 6 | 3,0,1 | 3,20% |
| USER DEFINED FAULT 3 | 1 | 010899 21:37:44:99 | - | 6 | 3,0,1 | 3,20% |
| ALL EVENTS | 16 | (logged in the above fields) | (calculated and logged in same manner as the above fields) | 50 | 50,3,3 | 3,20% | ns
METHOD OF DETECTING SYSTEMIC FAULT CONDITIONS IN AN INTELLIGENT ELECTRONIC DEVICE

FIELD OF THE INVENTION

The present invention relates generally to intelligent electronic devices, e.g., electronic trip units, protective relays, energy meters and power quality meters. More specifically, the present invention relates to a method of detecting systemic event or fault conditions in an intelligent electronic device.

BACKGROUND OF THE INVENTION

Intelligent electronic devices are well known. By way of example, an electronic trip unit (one such intelligent electronic device) typically comprises voltage and current sensors which provide analog signals indicative of the power line signals. The analog signals are converted by an A/D (analog/digital) converter to digital signals which are processed by a microcontroller. The trip unit further includes RAM (random access memory), ROM (read only memory) and EEPROM (electronic erasable programmable read only memory) all of which interface with the microcontroller. The ROM includes trip unit application code, e.g., main functionality firmware, including initializing parameters, and boot code. The EEPROM includes operational parameters for the application code.

The electronic trip unit detects fault conditions (i.e., events) such as breaker trips, relay events, downed conductors, or user defined event conditions. Once a fault condition is detected, the electronic trip unit generates an event message such as an alarm via a local display, external contacts, or by sending an event message to a centralized monitoring station such as a computer software program containing an event logging tool.

However, it is generally left to the user to analyze the raw event data to determine if the same event has occurred multiple times within a given time period such as to give indication that a systemic fault condition, i.e., a fault condition recurring due to the same root cause technical problem, exists which should be found and eliminated. There is especially a need in the area of utility relaying, where the physical environment surrounding the distribution systems often give rise to repeated faults which may be masked by automatic re-closure of breakers once the fault has cleared.

SUMMARY OF THE INVENTION

A method of detecting systemic fault conditions in an intelligent electronic device as indicated by repeated, similar fault events is presented. An electronic trip unit is described herein by way of example only, as the present invention applies to other intelligent electronic devices as well. In an exmplary embodiment of the invention the electronic trip unit comprises voltage and current sensors which provide analog signals indicative of the power line signals. The analog signals are converted by an A/D (analog/digital) converter to digital signals which are processed by a microcontroller. The trip unit further includes RAM (random access memory), ROM (read only memory) and EEPROM (electronic erasable programmable read only memory) all of which communicate with the microcontroller. The ROM includes trip unit application code, e.g., main functionality firmware, including initializing parameters, and boot code. The application code includes code for the systemic fault detection algorithm of the present invention. The EEPROM includes operational parameters, e.g., code for setting user defined events to be logged and/or time horizons for logging multiple similiar event occurrences, for the application code. These parameters may be stored in the trip unit at the factory and are selected to meet customer's requirements, but. can also be remotely downloaded.

For each such event that is detected by the intelligent electronic device the systemic fault detection algorithm logs the occurrence of the event. Optionally, the algorithm may also log the date and time of the event. The algorithm determines if this particular fault type (or event type) has occurred before (e.g., the same type of fault on the same phase). If such a fault has occurred before, the time since the last such fault occurrence and the total number of such fault type occurrences are determined. This is then compared against the user-input number of events and/or time frequency specified to merit the generation of a repeat event.

BRIEF DESCRIPTION OF THE DRAWINGS

FIGS. 2A–D are a user configured event storage table in accordance with the present invention.

DETAILED DESCRIPTION OF THE PREFERRED EMBODIMENTS

Figure 1:
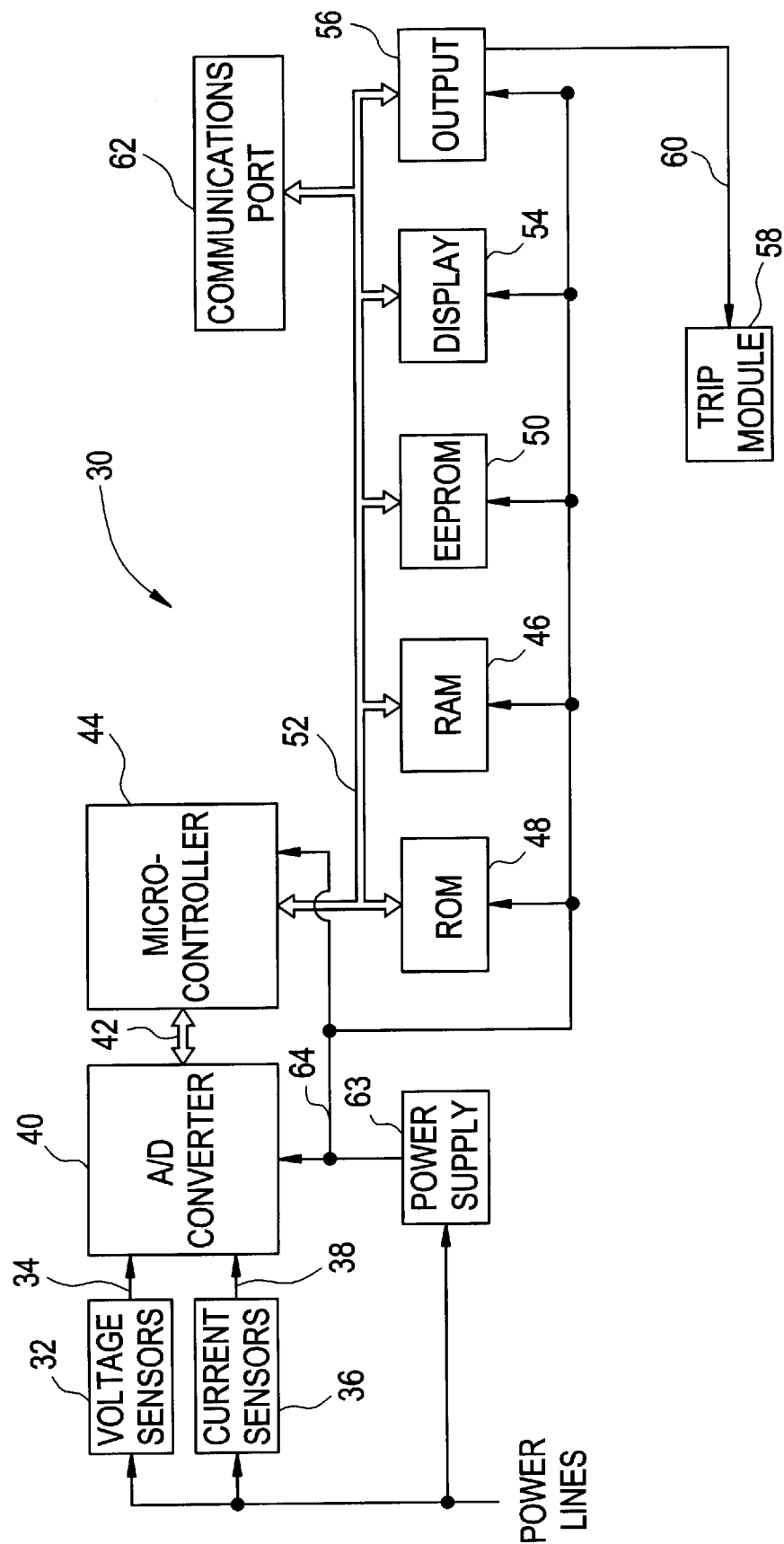
FIG. 1 is a schematic block diagram of an electronic trip unit in accordance with the present invention.

Referring to the FIG. 1, a general schematic of a trip unit is generally shown at 30. It will be appreciated that the present invention is not limited to electronic trip units but is directed intelligent electronic devices in general. Trip unit 30 comprises a voltage sensor 32 which provides analog signals indicative of voltage measurements on a signal line 34 and a current sensor 36 which provides analog signals indicative of a current measurements on a signal line 38. The analog signals on lines 34 and 38 are presented to an AID (analog/digital) converter 40, which converts these analog signals to digital signals. The digital signals are transferred over a bus 42 to a microcontroller (signal processor) 44, such being commercially available from the Hitachi Electronics Components Group (Hitachi's H8/300 family of microcontrollers). Trip unit 30 further includes RAM (random access memory) 46, ROM (read only memory) 48 and EEPROM (electronic erasable programmable read only memory) 50 all of which communicate with the microcontroller 44 over a control bus 52. It will be appreciated that A/D converter 40, ROM 48, RAM 46, or any combination thereof may be internal to microcontroller 44, as is well known. EEPROM 50 is non-volatile so that system information and programming will not be lost during a power interruption or outage. Data, typically status of the circuit breaker, is displayed by a display 54 in response to display signals received from microcontroller 44 over control bus 52. An output control device 56, in response to control signals received from microcontroller 44 over control bus 52, controls a trip module 58 via a line 60. Calibration, testing, programming and other features are accomplished through a communications I/O port 62, which communicates with microcontroller 44 over control bus 52. A power supply 63 which is powered by the service electricity, provides appropriate power over a line 64 to the components of trip unit 30. ROM 48 includes trip unit application code, e.g., main functionality firmware, including initializing parameters, and boot code. The application code includes code for a systemic fault detection algorithm in accordance with the present invention.

EEPROM 50 includes operational parameter code, e.g., code for setting user defined events to be logged and/or time horizons for logging multiple similar event occurrences. These parameters may be stored in the trip unit at the factory and are selected to meet customers requirements, but can also be remotely downloaded as described hereinafter. The systemic fault detection algorithm is run in real-time and is initiated preferably from the boot code at start up.

When a trip or relay event, e.g., short time, long time, instantaneous, underfrequency, overfrequency, or ground fault, has been detected and a breaker tripped and/or a contact closed the device will send an event message out. This message may be displayed on a local display and/or be communicated to a remote monitoring station such as inequipment monitor or a remote computer with power management control software. In other words, the trip or relay event is processed as known in the prior art.

In an exemplary embodiment of the invention, for each such event that is detected by the intelligent electronic device the systemic fault detection algorithm logs the occurrence of the event. The algorithm determines if this particular fault has occurred before, e.g., the same type of fault on the same phase.

In an implementation of the exemplary embodiment of the invention, a user configured event storage table is shown in FIGS. 2A–D and a systemic fault detection algorithm is provided below. In the user configured event storage table the following logic is applied: keep X events then reset OR use sliding window of X days then reset events outside of window. In accordance with the invention the event table (FIGS. 2A–D) and detection algorithm are implemented in the firmware of the intelligent electronic device. When a fault event occurs, it is processed by trip unit 30 as in the prior art. Additionally, the repeat fault event algorithm will go through the following endless loop:

1. If an event is received to 2, else proceed to 8.
2. The appropriate counter in column 2 is incremented and logged in non-volatile memory (table of FIGS. 2A–D).
3. Date and time for the event is logged in non-volatile memory (table of FIGS. 2A–D) if supported by trip unit 30.
4. Interval between events is calculated and logged in non-volatile memory (table of FIGS. 2A–D).
5. Total average interval between all events logged of the type in question is calculated and logged in non-volatile memory (table of FIGS. 2A–D).
6. Steps 2, 3 4 are repeated for All Events field.
7. It is verified if conditions in columns 5, 6 or 7 meriting a Repeat event has been met. If so the appropriate event(s) are renearated. Either a unique event number is associated with each condition or the event message passes along parameters allowing for the user to identify which condition was met to generate the event.
8. The software verifies if the new event triggers a reset of the events based on the number of events or the sliding window time condition.
9. Repeat program.

A limit may be set as to how many repeats should be observed before a repeat event/message is generated. Similarly a limit may be programmed in as to how many repeat events/messages should be generated regardless of the number of observations made. This information may be displayed at the trip unit 30 or at a central computer (not shown). This may be displayed (or printed) in the form of a log or by type of event along with the number of repeat events, the time since the prior event occurrence and/or the frequency of such event occurrences. This information is useful as an aid in determining the cause or root (i.e., systemic root cause) of these events as such would otherwise be difficult to determine.

This is because severe fault conditions often do not occur spontaneously but rather develop gradually over time, and often give rise to repeated lesser faults in the process. These repeated lesser faults may be masked by reclosures of circuit breakers, and can be difficult to detect manually from the raw event data. Additionally, if the raw event data is not properly analyzed, then only the symptoms of a problem may be addressed, while the preventable root cause could build up over time. Eventually, these root causes may become severe and cause a major fault event. Once this occurs, damage and costly delays to facility operations may occur. A major fault event caused by a systemic fault condition may cost a user substantial sums. By identifying repeating fault events automatically, these systemic fault conditions may be predicted, detected, and corrected before a major fault event occurs.

All of the aforementioned limits or settings are preferably stored in EEPROM 50 and can be altered by downloading desired settings via communications I/O port 62. This would include remotely downloading such data when the unit is connected to a system computer (not shown), either directly, over telephone lines, or any other suitable connection. It may also be preferred that EEPROM 50 comprises a flash memory whereby such data is flashed, as is well known.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of detecting repeating events in an electrical distribution system at an intelligent electronic device of the electrical distribution system, comprising:

generating an event signal indicative of a fault condition occurrence;

comparing said event signal to a prior event signal indicative of a prior fault condition to determine if the fault condition is a repeat of the prior fault condition; and generating a repeat event signal when the fault condition is a repeat of the prior fault condition.

2. The method of claim 1 further comprising:

detecting a systemic fault condition in the electrical distribution system in response to said repeat event signal.

3. The method of claim 1 further comprising:

verifying the event occurrence before said generating said repeat event signal.

4. The method of claim 1 further comprising:

generating an event log in response to said event signal and said prior event signal.

5. The method of claim 4 wherein said event log includes a specified time horizon in which the event is a repeat of the prior event.

6. The method of claim 1 further comprising:

determining a time interval between the event and the prior event.

7. The method of claim 1 further comprising:

determining a frequency of occurrences of the event and a plurality of the prior events.

8. The method of claim 1 wherein the fault condition comprises one or more of a downed conductor, a short time fault, a long time fault, an instantaneous fault, an underfrequency fault, an overfrequency fault, and a ground fault.

9. The method of claim 1 wherein said intelligent electronic device comprises an electronic trip unit, a protective relay, an energy meter or a power quality meter.

10. The method of claim 1 further comprising:

displaying information indicative of a repeat event in response to said repeat event signal.

11. An intelligent electronic device comprising:

a sensor for sensing an electrical signal of an electrical distribution system to provide a sensed signal indicative of an electrical characteristic thereof; and a signal processor responsive to said sensed signal, and having memory for storing signal including program signals defining an executable program for, generating an event signal in response to said sensed signal, said event signal indicative of an event occurrence, comparing said event signal to a prior event signal indicative of a prior event to determine if the event is a repeat of the prior event, and generating a repeat event signal when the event is a repeat of the prior event.

12. The intelligent electronic device of claim 11 wherein said program signals further define said executable program for detecting a systemic fault condition in the electrical distribution system in response to said repeat event signal.

13. The intelligent electronic device of claim 11 wherein said program signals further define said executable program for verifying the event occurrence before said generating said repeat event signal.

14. The intelligent electronic device of claim 11 further comprising:

a plotter responsive to said event signal and said prior event signal for generating an event log.

15. The intelligent electronic device of claim 14 wherein said event log includes a specified time horizon in which the event is a repeat of the prior event.

16. The intelligent electronic device of claim 11 wherein said program signals further define said executable program for determining a time interval between the event and the prior event.

17. The intelligent electronic device of claim 11 wherein said program signals further define said executable program for determining a frequency of occurrences of the event and a plurality of the prior events.

18. The intelligent electronic device of claim 11 wherein the event comprises a fault condition.

19. The intelligent electronic device of claim 11 wherein said intelligent electronic device comprises an electronic trip unit, a protective relay, an energy meter or a power quality meter.

20. The intelligent electronic device of claim 11 further comprising:

a display responsive to said repeat event signal for displaying information indicative of a repeat event.

* * * * *